UNITED STATES PATENT OFFICE.

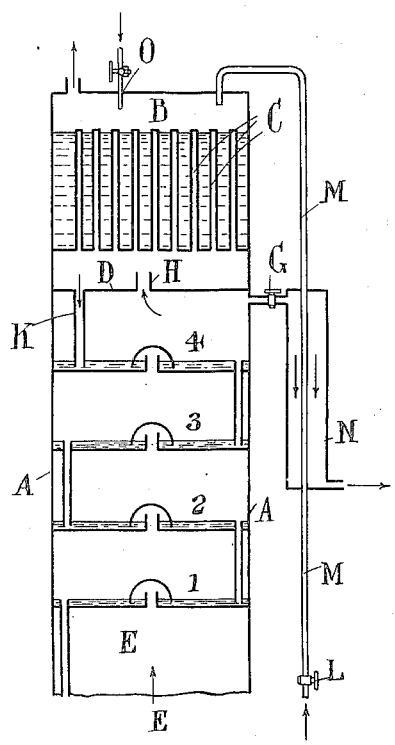

RENÉ JACQUES LÉVY AND ANDRÉ HELBRONNER, OF PARIS, FRANCE, ASSIGNORS TO LA SOCIÉTÉ L'AIR LIQUIDE (SOCIETE ANONYME POUR L'ETUDE ET L'EXPLOITATION DES PROCEDES GEORGES CLAUDE,) OF PARIS, FRANCE.

SEPARATION OF GASES FROM THEIR MIXTURES.

957,170.  Specification of Letters Patent.   Patented May 3, 1910.

Application filed June 3, 1907. Serial No. 377,054.

*To all whom it may concern:*

Be it known that we, RENÉ JACQUES LÉVY and ANDRÉ HELBRONNER, citizens of the Republic of France, both residing at 43 Rue St. Lazare, Paris, in the Republic of France, chemists, have invented certain new and useful Improvements in the Separation of Gases from Their Mixtures, Especially Oxygen and Nitrogen from Atmospheric Air, of which the following is a specification.

This invention relates to the separation of gases from their mixtures and particularly to the separation of oxygen and nitrogen from atmospheric air, the chief object being to enable pure oxygen and pure nitrogen to be obtained simultaneously.

In the process described in the prior United States specification Serial No. 143,703 liquid air is separated into its constituents by a method of rectification in which the gas rich in nitrogen resulting therefrom, is reliquefied, and subsequently utilized for completing the rectification. These features are again found in the present process.

According to this invention the gaseous nitrogen resulting from a method of rectification effected under pressure is directly reliquefied, while still under pressure, by causing it to vaporize the liquid oxygen resulting from the separation and existing at a lower pressure than that at which the separation is effected, and the liquid nitrogen thus obtained is utilized for completing the separation by finally rectifying the gases already rich in nitrogen.

The accompanying drawing, which is given by way of example, is a diagrammatic representation of apparatus for carrying the invention into practice.

It consists essentially of a rectification column A which is a prolongation of the upper part of the separator apparatus and consists of an appropriate number of plates or trays 1, 2, 3, 4 provided with cap-covered passages for controlling the flow of the gases in the upward direction and with overflows for the flow of the liquids in the downward direction.

Above the rectification column A, there is arranged a vaporizer consisting of a multitubular or similar arrangement C arranged in a vessel B and provided with a liquid collector D the tubes C being closed at the top.

The separator apparatus as a whole operates in the following manner:—The dry compressed air is cooled in the temperature exchangers which are not shown but are of the usual kind where the gaseous currents coming from the separator apparatus are made to cool the countercurrent of the air to be liquefied; the air then enters the separator apparatus where it liquefies in one or more portions, by vaporizing a corresponding quantity of liquid oxygen or a mixture of liquid oxygen and nitrogen. The air thus liquefied is then subjected to a methodical fractionation effected under pressure which divides it into a gas rich in nitrogen and into liquid oxygen. The gas rich in nitrogen thus produced, and coming from the part E of the apparatus, then traverses the rectification column A, the plates of which do not yet contain liquid, and then divides into two portions. One portion of the gas rich in nitrogen escapes through the cock G and proceeds to the aforesaid temperature exchangers. By means of this cock, the discharge of the gases is regulated in such a manner as to obtain the desired pressure in the separator apparatus and the multitubular or similar arrangement C. The other portion of the gas rich in nitrogen passes through the passage H into the vessel B and comes in contact with the said multitubular or similar arrangement C, which contains liquid oxygen under the atmospheric pressure and, if the pressure in the column A is well regulated, the aforesaid gas liquefies in the vessel B in vaporizing the surrounding liquid oxygen. The liquid nitrogen thus formed falls into the collector D and then passes through the conduit K, on to the upper plate 4 of the rectification column. The gas already rich in nitrogen coming from the part E of the separator apparatus thus finds itself, before leaving the apparatus, in successive contacts at 1, 2, 3, 4 with the reliquefied gas, and, owing to the large proportion of nitrogen in this latter, will yield up to it the oxygen that it still contains; the gas to be reliquefied, after this rectification, will therefore be richer in nitrogen than before; consequently the reliquefaction will give a liquid richer in nitrogen than that previously deliverd onto the upper plate 4, and so on in succession until normal conditions are established, that is to say, when the liquid of the plate 4 has a constant composition. On the other hand, the excess of liquid oxygen, which is produced by the separation and collects at the lower part of the separator apparatus, is discharged or passed into the vessel B through the cock L and the conduit M and in vaporizing in the said vessel furnishes the desired oxygen which is then sent to the exchangers.

Before passing the liquid oxygen into the vessel B, it is advantageous to cool it by means of the gaseous nitrogen which is furnished by the separator apparatus; this gas, which is already colder than the liquid oxygen, may also be expanded through the cock G up to atmospheric pressure, and thus undergo a fresh lowering of its temperature. The cooling of the liquid oxygen to be discharged or passed into B may be effected for example in the exchanger N, which is traversed by the liquid oxygen and the expanded nitrogen flowing in opposite directions. In thus cooling the liquid oxygen under pressure its partial vaporization may be avoided during its discharge or passage into B at a lower pressure. This novel method for the cooling and the liquefaction of a gas by means of separate gases issuing from the separator apparatus at low temperature is however general and may be adapted to all separation processes and more particularly to those where the separated gases are obtained under pressure.

A reserve liquid may be provided and introduced through the pipe O to compensate for loss of coldness in the apparatus due to the imperfection of the insulation and of the exchangers. To this end it is advantageous to employ liquid oxygen in place of the liquid air generally employed for this purpose; by this means the quantity of reliquefied nitrogen is increased.

It will of course be understood that the apparatus may be modified and arranged differently. Thus the separation under pressure and the creation of a more or less perfect vacuum on the liquid in the vessel B, might be effected concurrently.

It is obvious in fact that the conditions required for establishing any reliquefaction is the establishment of a sufficient difference between the pressure at which the separation is effected and the pressure at which the liquid boils in the vessel B.

What we claim and desire to secure by Letters Patent of the United States is:—

1. A process for the separation of a gaseous mixture into its constituents, consisting in separating the same after liquefaction into its constituents by rectification effected under pressure, and reliquefying the more volatile constituent resulting therefrom while still under pressure by causing it to vaporize under a lower pressure the less volatile constituent resulting from the separation.

2. A process for the separation of a gaseous mixture into its constituents consisting in separating the same after liquefaction into its constituents by rectification effected under pressure, reliquefying the more volatile gaseous constituent resulting therefrom while still under pressure by causing it to vaporize under a lower pressure the less volatile constituent resulting from the separation, and utilizing the reliquefied constituent to purify by rectification the gaseous constituent.

3. A process for the separation of air into oxygen and nitrogen, consisting in separating the same after liquefaction into liquid oxygen and gases rich in nitrogen by rectification effected under pressure, and reliquefying the gaseous nitrogen resulting therefrom while still under pressure by causing it to vaporize under a lower pressure the liquid oxygen resulting from the separation.

4. A process for the separation of air into oxygen and nitrogen, consisting in separating the same after liquefaction into liquid oxygen and gases rich in nitrogen by rectification effected under pressure, reliquefying the gaseous nitrogen resulting therefrom while still under pressure by causing it to vaporize under a lower pressure the liquid oxygen resulting from the separation, and utilizing the reliquefied nitrogen to purify by a further rectification the gases already rich in nitrogen resulting from the initial rectification.

5. A process for the separation of air into oxygen and nitrogen, consisting in separating the same after liquefaction into liquid oxygen and gases rich in nitrogen by rectification effected under pressure, reliquefying some of the nitrogen while still under pressure by vaporizing under a lower pressure the liquid oxygen resulting from the separation, utilizing the coldness of the remaining portion of nitrogen during its passage to the exchangers to cool the liquid oxygen under pressure prior to its being reduced to the aforesaid lower pressure, and utilizing the reliquefied nitrogen to purify by a further rectification the gases already rich in nitrogen resulting from the initial rectification.

6. A process for the separation of air into oxygen and nitrogen, consisting in separating the same after liquefaction into liquid oxygen and gases rich in nitrogen by rectification effected under pressure, reliquefying some of the nitrogen while still under pressure by vaporizing under a lower pressure the liquid oxygen resulting from the separation, utilizing the reliquefied nitrogen to purify by a further rectification in successive steps the gases already rich in nitrogen resulting from the initial rectification, and utilizing the gaseous nitrogen resulting from the separation for cooling the liquid oxygen prior to the final reduction in pressure upon it.

7. A process for the separation of air into oxygen and nitrogen, consisting in separating the same after liquefaction into liquid oxygen and gases rich in nitrogen by rectification effected under pressure, reliquefying some of the nitrogen while still under pressure by vaporizing under a lower pressure the liquid oxygen resulting from the separation, utilizing the reliquefied nitrogen to purify by a further rectification the gases already rich in nitrogen resulting from the initial rectification, producing cold by expanding the gaseous nitrogen resulting from the separation, and utilizing the coldness thus produced to cool the liquid oxygen prior to the final reduction in pressure upon it.

8. A process for the separation of air into oxygen and nitrogen, consisting in separating the same after compression, cooling and liquefaction into liquid oxygen and gases rich in nitrogen by rectification effected under pressure, reliquefying some of the nitrogen while still under pressure by vaporizing under a lower pressure the liquid oxygen resulting from the separation, utilizing the reliquefied nitrogen to purify by a further rectification in successive steps the gases already rich in nitrogen resulting from the initial rectification, producing cold by expanding the gaseous nitrogen resulting from the separation, utilizing the cold thus produced to cool liquid oxygen prior to the final reduction in pressure upon it and utilizing the liquid oxygen in the reliquefaction of the nitrogen.

In testimony whereof we affix our signatures in presence of two witnesses.

RENÉ JACQUES LÉVY.
ANDRÉ HELBRONNER.

Witnesses:
JOHN BARNES,
H. C. COXE.